United States Patent
Oskamp et al.

(10) Patent No.: US 12,389,833 B2
(45) Date of Patent: Aug. 19, 2025

(54) CONVEYOR FOR A BALER COMPRISING A FEED BAR COMPRISING A FEED MODE AND A COLLECTION MODE

(71) Applicant: Maschinenfabrik Bernard Krone GmbH & Co. KG, Spelle (DE)

(72) Inventors: Tobias Oskamp, Ochtrup (DE); Steffen Roling, Hopsten (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 832 days.

(21) Appl. No.: 17/692,217

(22) Filed: Mar. 11, 2022

(65) Prior Publication Data
US 2022/0287241 A1    Sep. 15, 2022

(30) Foreign Application Priority Data
Mar. 12, 2021  (DE) .................... 10 2021 106 061.3

(51) Int. Cl.
*A01F 15/10*        (2006.01)

(52) U.S. Cl.
CPC ........ *A01F 15/10* (2013.01); *A01F 2015/102* (2013.01); *A01F 2015/108* (2013.01)

(58) Field of Classification Search
CPC ............... A01F 15/10; A01F 2015/102; A01F 2015/108; A01F 15/101
See application file for complete search history.

(56) References Cited

U.S. PATENT DOCUMENTS

| | | | | |
|---|---|---|---|---|
| 4,569,282 | A * | 2/1986 | Galant | A01F 15/101 100/189 |
| 4,928,462 | A * | 5/1990 | Lippens | A01F 15/101 100/189 |
| 5,768,872 | A | 6/1998 | Von Allworden | |
| 6,050,074 | A | 4/2000 | Clostermeyer | |
| 6,425,234 | B1 | 7/2002 | Krone et al. | |
| 10,004,177 | B2 * | 6/2018 | Weyne | A01F 15/042 |
| 2005/0072133 | A1 * | 4/2005 | Dubois | A01F 15/101 56/341 |
| 2012/0204740 | A1 * | 8/2012 | Bergmann | A01F 15/101 100/215 |

(Continued)

FOREIGN PATENT DOCUMENTS

| | | | | |
|---|---|---|---|---|
| DE | 3913496 | A * | 12/1989 | ........... A01F 15/101 |
| DE | 4111985 | A1 * | 10/1992 | ............. A01F 15/10 |

(Continued)

*Primary Examiner* — Arpad Fabian-Kovacs
(74) *Attorney, Agent, or Firm* — Gudrun E. Huckett

(57) ABSTRACT

A conveyor for a baler has a feed bar with first and second bar parts connected by a coupling such that, from a stop position, the bar parts are rotatable relative to each other in a rotational direction against a restoring force and coupled to each other in the stop position to prevent rotation in opposite rotational direction. The conveyor conveys crop within a collection chamber toward a press chamber in collection mode and from the collection chamber into the press chamber in feed mode by feed tines of the first bar part. The conveyor guides the first bar part in collection mode by a feed collection lever of the second bar part and by force transmission via the coupling and guides the first bar part in feed mode partially by a feed lever of the first bar part by rotating the bar parts relative to each other.

14 Claims, 7 Drawing Sheets

(56) References Cited

U.S. PATENT DOCUMENTS

| | | | |
|---|---|---|---|
| 2013/0104512 A1 | 5/2013 | Duenwald et al. | |
| 2015/0373911 A1 | 12/2015 | Weyne | |
| 2017/0105347 A1* | 4/2017 | Rosseel | A01D 89/002 |
| 2017/0105352 A1 | 4/2017 | Rosseel et al. | |
| 2017/0188519 A1* | 7/2017 | Figger | A01F 15/0841 |
| 2021/0100169 A1* | 4/2021 | Vandaele | A01F 15/0825 |

FOREIGN PATENT DOCUMENTS

| | | | |
|---|---|---|---|
| DE | 42 19 490 | 12/1993 | |
| EP | 1091636 B1 * | 7/2002 | A01F 15/101 |
| EP | 3903563 A1 * | 11/2021 | A01F 15/10 |
| WO | WO-0001215 A1 * | 1/2000 | A01F 15/101 |
| WO | WO-2011162597 A1 * | 12/2011 | A01F 15/046 |

* cited by examiner

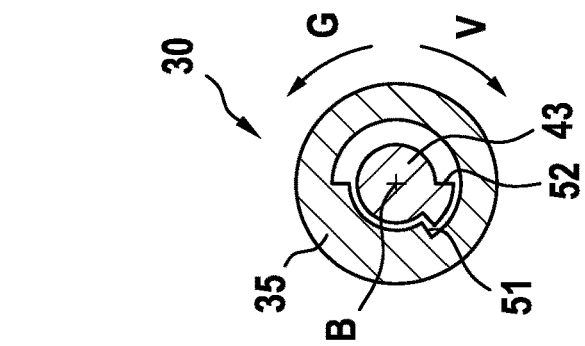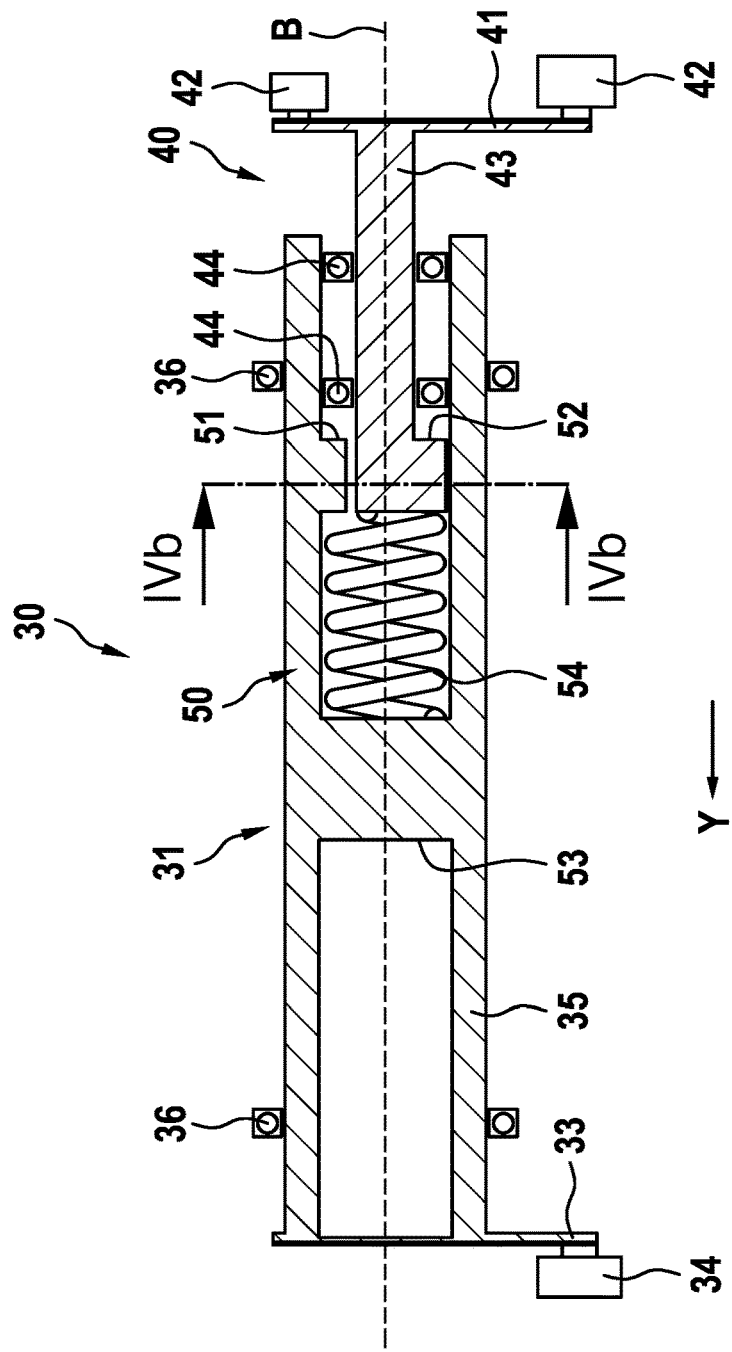

CONVEYOR FOR A BALER COMPRISING A FEED BAR COMPRISING A FEED MODE AND A COLLECTION MODE

BACKGROUND OF THE INVENTION

The present invention relates to a conveyor for a baler with a feed bar extending along an axial feed axis that comprises a first bar part comprising a plurality of feed tines as well as a feed lever, wherein the conveyor is configured to convey crop within a collection chamber by means of the feed tines in the direction toward a press chamber in a collection mode and to convey crop from the collection chamber into the press chamber by means of the feed tines in a feed mode.

The invention furthermore relates to a feed bar for a conveyor of a baler, wherein the feed bar extends along an axial feed axis and comprises a first bar part comprising a plurality of feed tines as well as a feed lever, wherein the feed bar is configured to convey crop within a collection chamber by means of the feed tines in the direction toward a press chamber in a collection mode and to convey crop from the collection chamber into the press chamber by means of the feed tines in a feed mode.

The invention further relates to a baler comprising a collection chamber, a press chamber, as well as a conveyor, wherein the conveyor comprises a feed bar extending along an axial feed axis that comprises a first bar part comprising a plurality of feed tines as well as a feed lever, wherein the conveyor is configured to convey crop within the collection chamber by means of the feed tines in the direction toward the press chamber in a collection mode and to convey crop from the collection chamber into the press chamber by means of the feed tines in a feed mode.

Balers are used in agriculture in order to press crop, such as hay or straw which has been picked up before, to bales. In this context, the crop is supplied to form the bale step by step until the bale has reached a predetermined shape and size and can be packaged or tied. Tying with a tying material can be realized either within the baler or in a bale tying device separate from the baler. The crop is usually picked up from the ground by a pick-up that is integrated in the baler. In case of a square baler, compression of the collected crop is done in two steps. First, the crop that is received from the pick-up and optionally has been cut by a cutting device is conveyed by a conveying device or collection device within a collection chamber, gathered, and pre-compressed in this context. The collection chamber has arranged downstream thereof a press chamber which is separated from the collection chamber by a retainer. When a certain quantity of precompressed crop has been collected in the collection chamber, the retainer opens the access to the press chamber and the crop is conveyed into the press chamber. Here, a reciprocating press piston is acting on the crop and carries out the actual compression. Thus, a precompressed crop is transferred in portions into the press chamber where the square bale is successively assembled.

The conveying or collection device must fulfill two temporarily changing functions. On the one hand, collecting or gathering of the crop within the collection chamber as well as, on the other hand, supplying or feeding of the crop from the collection chamber into the press chamber. Both functions are realized in general by one or a plurality of rakes which act on the crop with a plurality of tines. For an optimal feed to the press chamber, a different movement of the tines is required or expedient in comparison to the prior collection. In this context, different solutions are known in the prior art, for example, from U.S. Pat. No. 6,050,074 or US 2015/0373911.

In an embodiment known from the prior art, a plurality of rakes are mounted rotatably on a driven rotor unit, respectively. One or a plurality of rakes, which are also referred to as collection bars, are provided exclusively for collection while at least one other rake, which is also referred to as a feed bar, is provided for feeding. In this context, it is known that each collection bar comprises a collection lever fixedly connected thereto and guided by means of a plurality of rotatably supported rollers on at least one first cam track. Due to the interaction of the driven rotation of the rotor unit at which the collection bar is rotatably supported and of the collection lever which is guided by the first cam track, the orientation of the collection bar and thus of the tines can be defined across the entire course of one revolution. In a corresponding manner, the feed bar comprises a feed lever that is guided by one or a plurality of rotatably supported rollers on at least one second cam track.

As described in DE 42 19 490 A1, guiding by the second cam track can be the same for each revolution which however means that crop is conveyed from the collection chamber into the press chamber with each revolution of the rotor unit. This can be inefficient for various reasons, for example, because the quantity of the picked-up crop that is transferred to the collection chamber can vary significantly. Therefore, systems have been developed in which the feed bar can operate selectively in a collection mode or in a feed mode. In the collection mode, the movement corresponds approximately to that of the collection bars while in the feed mode a movement is realized that is adapted specifically to conveying of crop into the press chamber. For this purpose, the second cam track can be positioned differently in the feed mode than in the collection mode, which is described, for example, in U.S. Pat. No. 6,425,234. Switching between collection mode and feed mode can be triggered, for example, as a function of the fill level of the collection chamber. A similar system is known from U.S. Pat. No. 5,768,872.

Object of the invention is to provide a reliable and simple system that enables a change between a collection mode and a feed mode for a feed bar.

SUMMARY OF THE INVENTION

The object is solved for a conveyor of a baler in that the feed bar comprises a second bar part with a feed collection lever, wherein the bar parts are rotatable relative to each other about the feed axis and are connected by a coupling to each other such that, beginning from a stop position, they are rotatable relative to each other in a rotational direction against a restoring force and in the opposite rotational direction are coupled so as to prevent relative rotation, wherein the conveyor is configured to guide the first bar part in the collection mode by means of the feed collection lever and by force transmission via the coupling and to guide the first bar part in the feed mode at least partially by means of the feed lever with rotation relative to the second bar part.

Advantageous embodiments are disclosed in the dependent claims.

According to the invention, a conveyor for a baler is provided with a bar part that is rotatably supported about an axial feed axis on a driveable bar support, wherein the feed bar comprises a first bar part with a plurality of feed tines as well as a feed lever, wherein the conveyor is configured to convey crop within a collection chamber by means of the feed tines in the direction toward the press chamber in a collection mode and to convey crop from the collection chamber into the press chamber by means of the feed tines in a feed mode.

The baler can be in particular a square baler, optionally however also a round baler. In general, such a baler is configured to press the crop that has been picked up from the ground before (normally by the baler itself). The crop can be in particular stem material such as grass, straw or hay. In this context, the term "baler" includes expressly also machines that, in addition to pressing of the crop to bales, also perform tying or packaging of the bales. The baler can be a self-propelled baler or a pulled baler.

In the installed state, the conveyor is arranged in a collection chamber or comprises a collection chamber. The collection chamber, which at least in some embodiments can also be referred to as a pre-press chamber, conveying channel or feed channel, is arranged in relation to the crop flow in front of the press chamber in which the actual compression of the crop to bales is carried out. Even though the invention is not limited thereto, in the press chamber normally an oscillating press piston is arranged which acts on the crop introduced into the press chamber. At least in some embodiments, the press chamber can be referred to also as a press room or press channel. The collection chamber or the conveyor, in turn, is arranged in relation to the crop flow normally directly or indirectly downstream of a collecting device or pick-up which picks up crop from the ground.

The conveyor comprises a feed bar extending along an axial feed axis that comprises a first bar part comprising a plurality of feed tines as well as a feed lever. The feed bar could also be referred to as supply strip, feed rake or supply rake. It extends along a feed axis that defines an axial direction (and thus also a tangential and radial direction). The feed bar extends along the feed axis, which generally means that it comprises an extension in the direction of the feed axis that is not negligible. This can possibly be its largest extension. Moreover, the feed bar can be oriented along the feed axis. Parts of the feed bar can be arranged symmetrically in relation to the feed axis. The feed tines extend normally radially away from the feed axis. Different elements of the first bar part, which possibly can also be referred to as first bar component group, can be detachably or non-detachably connected to each other. Normally, it is provided that the feed tines and the feed lever in relation to the feed axis are fixedly (non-rotatably) connected to each other, wherein also at least one feed tine is formed as one piece together with the feed lever. The term "lever" here and in the following is to be interpreted broadly and refers generally to an element by means of which torque can be exerted, in case of the feed lever a torque on the first bar part in relation to the feed axis. Generally, a lever therefore extends (radially) away from the axis of rotation (in this case the feed axis). When no opposite larger torque is acting, the first bar part can be pivoted by means of the feed lever about the feed axis.

As a whole, the conveyor is designed to convey crop within the collection chamber in the direction toward the press chamber by means of the feed tines in a collection mode and to convey crop by means of the feed tines from the collection chamber into the press chamber in a feed mode. This means that in the collection mode the conveyor moves the feed tines such that they convey crop within the collection chamber in the direction to the press chamber, which corresponds to the general movement of the crop flow within the baler. In the collection mode, the transition between the collection chamber and the press chamber is normally blocked by a retainer until enough crop has been collected and precompressed in the collection chamber near the press chamber. In addition to the collection mode, the conveyor can be changed or switched into a feed mode in which the feed tines convey or lift the crop from the collection chamber into the press chamber. Provided a retainer as mentioned above is present, the retainer releases the access to the press chamber prior to conveyance into the press chamber. In this context, the feed tines in the collection mode, on the one hand, and in the feed mode, on the other hand, are moved differently, i.e, corresponding to different movement paths.

According to the invention, the feed bar comprises a second bar part with a feed collection lever, wherein the bar parts are rotatable relative to each other about the feed axis and are connected to each other by a coupling such that, beginning from a stop position, they are rotatable relative to each other in a rotational direction against a restoring force and are coupled in the opposite rotational direction so as to prevent relative rotation relative to each other. Accordingly, within the feed bar one can identify, aside from the above mentioned first bar part (with the feed tines), a second bar part which comprises a feed collection lever. Normally, the two levers are arranged axially at the ends at the feed bar, in particular at axially opposite end regions of the feed bar. The first bar part and the second bar part are connected to each other so as to be rotatable relative to each other about the feed axis. In this context, by an intermediately arranged coupling, a connection is provided which, in relation to a stop position, enables a rotation with restoring action in a rotation direction against a restoring force. This means that when the two bar parts are rotated relative to each other out of the stop position in the rotational direction, the coupling generates a restoring force that tends to return the bar parts again into the stop position. In opposite rotational direction, the coupling prevents rotation, i.e., at least under normal operating conditions a rotation in opposite direction is not possible or limited to a negligible measure. The opposite direction can therefore be referred to as blocking direction or stop direction. In this context, it would be conceivable to design the coupling as an overload coupling that releases the movement in opposite direction in case an unusually high torque between the two bar parts occurs. In this case, the coupling would be designed such that it would release the corresponding movement only when the torque has reached a value that is not to be expected for normal disturbance-free operation. Usually, the coupling however provides a stop in relation to the opposite direction that completely prevents a (noticeable) rotation in opposite direction.

Furthermore, the conveyor is configured according to the invention to guide the first bar part in collection mode by means of the feed collection lever and by force transmission via the coupling and to guide the first bar part in the feed mode at least partially by means of the feed lever with rotation relative to the second bar part. This means that the first bar part at which the feed tines are arranged is guided in the collection mode by means of the feed collection lever, wherein the force flow extends across the second bar part and the coupling to the first bar part. In this context, the conveyor acts on the feed collection lever and thus on the second bar part. It is understood that in this context the action on the second bar part is primarily such that the coupling is loaded in the opposite rotational direction so that a (noticeable) rotation of the two bar parts is prevented. Correspondingly, the two bar parts in the collection mode normally remain in the stop position. In general, in the collection mode no external force loading of the feed lever occurs so that the feed lever essentially can move substantially freely. In the feed mode, on the other hand, the conveyor guides the first bar part at least partially by means of the feed lever wherein the first bar part is rotated relative to the second bar part. The corresponding rotation is realized, of course, in the aforementioned rotational direction. Guiding of the first bar part relates in this context in particular to an adjustment of the (pivot) position of the first bar part in relation to the feed axis, one could also say an orientation of the first bar part.

According to the invention, the two levers which are engaging at the feed bar—the feed collection lever and the feed lever—are used to differently guide or orient the first bar part and thus the feed tines in the collection mode and in the feed mode. In this context, the elastic coupling of the two bar parts that makes it possible to rotate the first bar part in relation to the second bar part and thus relative to the feed collection lever is of particular importance. The first bar part can therefore be guided by means of the feed lever in a predetermined manner even when at the same time a different guiding action would be preset by means of the feed collection lever. This enables, for example, in a preferred manner that the second bar part is guided in the same manner in the collection mode and in the feed mode by means of the feed collection lever. The movement path of the feed tines changed in the feed mode is realized by the guide action of the feed lever. It is advantageous in particular that the feed lever is not required or must not be guided in the collection mode because the guiding action in this case is realized by means of the feed collection lever.

Preferably, the feed bar is rotatably supported about the feed axis on a drivable bar support. In this context, the feed bar can be connected by at least one rotary bearing, usually at least two rotary bearings (in particular a rolling bearing), to the bar support. The bar support can be driven, i.e., is movable by a drive so that also the feed axis is moved. The latter forms, in turn, a rotary or pivot axis of the feed bar. The aforementioned movement of the bar support is realized in this context relative to a frame, housing or the like of the baler at which the bar support is movably supported directly or indirectly. Preferably, the bar support is designed as a rotor unit that can be driven in rotation about a rotor axis spaced apart from the feed axis. In this case, the conveyor is designed as a rotary conveyor. In particular, the rotor unit can comprise two drum disks that are spaced apart in axial direction and can be driven about a common rotor axis. In this case, the feed bar is connected by means of a respective rotary bearing (in particular a rolling bearing) to each one of the drum disks. It is understood that the feed axis in general extends parallel to the rotor axis.

One embodiment provides that the conveyor is configured to guide the first bar part by interaction of a collection guide element with the feed collection lever in the collection mode and to guide the first bar part at least partially by interaction of a feed guide element with the feed lever in the feed mode. This means that the first bar part at which the feed tines are arranged is guided in the collection mode by means of the feed collection lever wherein a collection guide element of the conveyor interacts with the feed collection lever. In the feed mode, on the other hand, the conveyor guides the first bar part at least partially by interaction of a feed guide element with the feed lever wherein the first bar part is rotated relative to the second bar part. The corresponding rotation is realized, of course, in the aforementioned rotational direction. As already mentioned above, the second bar part can be guided by the feed collection lever in the same manner in the collection mode and in the feed mode so that the collection guide element in both modi can be moved in the same manner or can assume the same position, i.e., can remain stationary. The movement path of the feed tines that is changed in the feed mode is realized by guiding of the feed lever by means of the feed guide element. Particularly advantageous is in this context that the feed lever and the feed guide element correlated therewith are not required in the collection mode because the guiding action in this case is realized by the feed collection lever. Correspondingly, the feed guide element must be designed only for one mode which can simplify its configuration and/or its control. The here described embodiment can be combined with the rotatable arrangement of the feed bar at a drivable bar support. In this case, the interaction of the respective guide element with the lever correlated therewith can entirely or partially result from the movement of the feed bar, wherein the lever is moved along the (possibly stationarily held) guide element.

It would be conceivable that the collection of the crop in the collection mode is realized exclusively by the feed tines of a single feed bar or a plurality of feed bars that are distributed about the rotor axis. The latter arrangement means however in general an unnecessary construction expenditure due to the structure of the feed bar with the two bar parts, the intermediately arranged coupling as well as the two levers.

An effective function of the conveyor in the collection mode with simultaneous minimal constructive expenditure can be achieved in that the conveyor comprises at least one collection bar that is supported rotatably about a connection axis at the rotor unit and comprises a plurality of collection tines as well as a collection lever that interacts at least in the collection mode with the collection guide element. Particularly advantageous in this embodiment is that the collection guide element is used for guiding the collection bar(s) as well as the second bar part of the feed bar. Normally, it is provided that the collection tines and the collection lever are connected fixedly (non-rotatably) in relation to the collection axis, wherein also at least one collection tine can be formed as one piece together with the collection lever. The respective collection axis extends in general parallel to the rotor axis as well as to the feed axis. The distance of the collection axis from the rotor axis can be in particular the same as the distance of the feed axis from the rotor axis. A plurality of collection bars can be distributed about the rotor axis. According to a typical configuration, the conveyor comprises precisely one feed bar as well as additionally two to five, in particular three or four, collection bars. However, other numbers are explicitly also possible in the context of the invention. Preferably, the collection lever interacts also in the feed mode with the collection guide element.

Preferably, the coupling is received at least partially within the first bar part. This means that the first bar part is at least in sections embodied to be hollow, for example, as a tube, and comprises an inner chamber in which the coupling can be received completely or partially. In this manner, the coupling can be protected from mechanical damage and from soiling which favors a disruption-free operation of the conveyor.

Advantageously, the coupling comprises a first coupling part that is fixedly connected to the first bar part as well as a second coupling part that is fixedly connected to the second bar part, wherein the coupling parts in the stop position at least indirectly form together a tangential form fit connection. The coupling further comprises at least one elastic spring element that is connected at least indirectly force-transmittingly to the two bar parts. In this context, it is however also possible that the first coupling part is formed as one piece together with the first bar part and/or the second coupling part is embodied as one piece together with the second bar part. In the stop position, the two coupling parts form in tangential direction (in relation to the feed axis) either directly a form fit connection so that they contact each other directly or by means of at least one element that is intermediately positioned in tangential direction. In any case, the coupling acts in this manner as a stop that prevents a rotation in the opposite rotational direction. The corresponding stop can however comprise a damping element, for example, an elastomeric damping element, that upon sudden restoring into the stop position prevents that the coupling parts impact on each other which could mean an undesirable noise development or a premature wear. Moreover, the coupling comprises an elastic spring element that either directly or indirectly is connected force-transmittingly to the first bar part as well as the second bar part. It is understood that the at least one spring element is connected such to the bar parts that upon rotation in the rotational direction it is elastically deformed so that the aforementioned restoring moment can be generated. In particular, the at least one spring element can be connected directly to a coupling part.

In order to generate the desired effect of the coupling, different technical configurations are conceivable. The elastic deformation of the spring element can correspond in particular to compression, stretching, bending and/or torsion. The spring element can be comprised, for example, of an elastomer material (e.g. rubber), of fiber-reinforced plastic material, or of spring steel. Depending on the application, different spring geometries can be employed. It has been found to be particularly advantageous that at least one spring element is embodied as a torsion spring. The torsion spring can be embodied in this context as a coil spring which is oriented along the feed axis and with one end is directly or indirectly connected to the first bar part and with the other end directly or indirectly to the second bar part.

According to an embodiment of the invention, the second bar part comprises an axially extending shaft that is arranged at least mostly within the first bar part. The corresponding shaft is in general symmetrically arranged in relation to the feed axis and is normally connected fixedly (non-rotatably) at its end directly or indirectly to the feed lever. Normally, the shaft is embodied as a single piece but it can also be comprised of a plurality of parts that are fixedly (non-rotatably) connected to each other. It can be rotatably supported within the first bar part by one or a plurality of rotary bearings, in particular rolling bearings. Also, the aforementioned second coupling part can be fixedly (non-rotatably) connected to the shaft. Also, a torsion spring as mentioned above can be directly or at least indirectly connected to the shaft. A corresponding shaft ensures with a sufficient length a stable connection of the two bar parts; at the same time, the shaft itself as well as rotary bearings intermediately arranged between the shaft and the first bar part can be arranged in a compact arrangement inside of the first bar part and can be protected from damage or soiling at the same time.

An embodiment of the invention provides that the feed guide element is embodied to interact in the feed mode only temporarily with the feed lever so that the first bar part is guided intermittently by interaction of the collection guide element with the feed collection lever. This means that during the collection mode the feed lever only temporarily is in contact with the feed guide element while intermittently it is released from it. In this time, the first bar part is guided by the interaction of the collection guide element with the feed collection lever. As far as no force action is acting on the feed lever, the coupling effects in this context a restoring movement of the bar parts into the stop position. For example, with a rotatable bar support in which the feed axis circulates about the rotary axis, the feed guide element can be in contact with the feed lever only with a portion of the circulating movement, for example, at most 270° or at most 180°. Since the feed guide element must guide only a portion of the movement, it can be embodied so as to save more material and be more lightweight, as needed.

A preferred embodiment of the invention provides that the collection guide element comprises at least one collection cam track with which the feed collection lever at least in the collection mode is in engagement by means of at least one collection engagement element spaced apart from the feed axis, and the feed guide element comprises at least one feed cam track with which the feed lever in the feed mode is in engagement by means of at least one feed engagement element spaced apart from the feed axis. The collection cam track or feed cam track has a shape that at least on one side, possibly also on both sides, provides a form fit connection with the collection engagement element or feed engagement element so that the engagement element is guided along the cam track. The cam track can form in this context a guide profile or a guide rail with which the engagement element interacts. The collection guide element or feed guide element comprises at least one collection cam track or feed cam track which includes the possibility that the guide element is embodied as a cam track. Even though here "one" engagement element as well as "one" cam track are mentioned, it is conceivable that the feed collection lever or the feed lever comprises at least two collection engagement elements or feed engagement elements and/or that at least two collection cam tracks or feed cam tracks are provided. Also, it is possible that at least one cam track is comprised of a plurality of sections that are spaced apart from each other or is embodied with interruptions, i.e., is not of a continuous configuration. The term "cam track" is not to be understood such that the shape of the corresponding track is continuously curved. Instead, it can also be embodied in parts in a straight or optionally angled configuration.

The movement of the guide elements at the cam track correlated therewith should provide, on the one hand, a safe well-defined guiding action of the corresponding lever but, on the other hand, should be realized also as low in friction as possible in order to minimize the energy expenditure and wear. For this reason, it is preferred that at least one guide element is embodied as a rotatably supported roller. In case of a collection engagement element, one can speak of a collection roller which is rotatably supported at the feed collection lever and in case of a feed engagement element one can speak of a feed roller which is rotatably supported at the feed lever.

Particularly preferred, the collection cam track in the collection mode and in the feed mode is arranged in the same position so that the second bar part is guided by the collection cam track by means of the feed collection lever in the collection mode as well as in the feed mode. This means that the collection cam track can be mounted stationarily within the baler, for example, at a housing of the conveyor and remains thus in the same position independent of the mode. The guiding action of the second bar part is thus also identical. Without the action of the feed lever, the feed tines would therefore move in the same manner in the collection mode and in the feed mode. As explained above, a suitable movement path of the feed tines is however generated by the guiding action of the feed lever and the rotation of the two bar parts relative to each other.

In this context, it is preferred that the feed cam track in the collection mode is arranged in a collection position in which the feed engagement element is kept out of engagement with the feed cam track, and in the feed mode is adjusted into a feed position in which the feed engagement element can be brought into engagement with the feed cam track. In this context, the collection position as well as the feed position are each stationary, i.e., aside from an unavoidable transition phase upon adjustment between the two positions, the feed cam track is held stationarily within the respective mode. This simplifies, of course, the control of the feed cam track significantly. The change between feed mode and collection mode can be, for example, realized while the feed tines are not in engagement with the crop. In the collection position, the feed cam track is not in engagement with the feed engagement element so that substantially no external forces are acting on the feed lever. Correspondingly, the guiding action of the first bar part is realized by means of the feed collection lever and the intermediately arranged coupling. In the feed position, on the other hand, the feed cam track is at least temporarily in engagement with the feed engagement element so that guiding of the first bar part is realized at least temporarily by the feed lever.

According to an embodiment, the feed cam track, for example, can be displaceable in axial direction between the collection position and the feed position. In general, it is however constructively simpler when the feed cam track is pivotable between the collection position and the feed position. In this context, it can be pivotably supported about a cam track axis at a housing of the conveyor, wherein the corresponding cam track axis can extend in particular axially, i.e., parallel to the feed axis.

As already mentioned above, the conveyor can comprise a retainer which delimits the collection chamber in relation to the press chamber. According to a preferred embodiment, a change from the collection mode to the feed mode as a function of the action of the crop on the retainer can be triggered by a control unit. In the simplest case, the control unit could be designed purely mechanically and thus produce a mechanical connection between the retainer and the respective element which effects guiding of the feed lever. Normally, however, a sensor is provided which measures the effect of the crop on the retainer and, as a function thereof, triggers an actor that effects switching into the feed mode. The effect of the crop on the retainer could be, for example, a load on the retainer by a force or a torque. In particular, it can be comprised of a deflection of the retainer by the crop acting thereon. Inasmuch as the retainer has a sensory function in this embodiment, it can also be referred to at least in some embodiments as a sensing rocker. As an alternative to the effect of the crop on the retainer, for example, a force acting on the feed tines and/or the collection tines or a torque could be measured also. When the corresponding torque exceeds a certain threshold value, it can be assumed that a sufficient filling level of the collection chamber is provided.

The object is further solved by a feed bar for a conveyor of a baler, wherein the feed bar comprises a second bar part with a feed collection lever, wherein the bar parts are rotatable relative to each other about the feed axis and are connected by a coupling to each other such that, beginning from a stop position, they are rotatable relative to each other in a rotational direction with restoring action and in the opposite rotational direction are coupled so as to prevent relative rotation, wherein the first bar part can be guided in the collection mode by means of the feed collection lever and by force transmission via the coupling and can be guided in the feed mode at least partially by means of the feed lever with rotation relative to the second bar part.

The feed bar extends along an axial feed axis and comprises a first bar part with a plurality of feed tines as well as a feed lever, wherein the feed bar is provided to convey crop within a collection chamber in the direction toward a press chamber by means of the feed tines in a collection mode and convey crop from the collection chamber into the press chamber in a feed mode by means of the feed tines.

According to the invention, the feed bar comprises a second bar part with a feed collection lever, wherein the bar parts are rotatable relative to each other about the feed axis and are connected by a coupling to each other such that, beginning from the stop position, they are rotatable relative to each other against a restoring force in a rotational direction and in the opposite rotational direction are coupled so as to prevent rotation, wherein the first bar part in the collection mode is guided by means of the feed collection lever and by force transmission via the coupling and in the feed mode is guided at least partially by means of the feed lever with rotation relative to the second bar part.

The aforementioned terms have already been explained above in relation to the conveyor according to the invention and are therefore not explained again. Advantageous embodiment of the feed bar according to the invention correspond to those of the conveyor according to the invention.

The object is also solved for a baler in that the feed bar comprises a second bar part with a feed collection lever wherein the bar parts are rotatable relative to each other about the feed axis and are connected by a coupling to each other such that, beginning from a stop position, they are rotatable relative to each other in a rotational direction with restoring action and in the opposite rotational direction are coupled so as to prevent relative rotation, wherein the conveyor is configured to guide the first bar part in the collection mode by means of the feed collection lever and by force transmission via the coupling and to guide the first bar part in the feed mode at least partially by means of the feed lever with rotation relative to the second bar part.

The baler comprises a collection chamber, a press chamber, as well as a conveyor, comprising a feed bar extending along an axial feed axis that comprises a first bar part with the plurality of feed tines as well as a feed lever, wherein the conveyor is configured to convey crop within the collection chamber in the direction toward the press chamber by means of the feed tines in a collection mode and to convey crop from the collection chamber into the press chamber by means of the feed tines in a feed mode.

According to the invention, the feed bar comprises a second bar part with a feed collection lever, wherein the bar parts are rotatable about the feed axis relative to each other and are connected by a coupling to each other such that, beginning from a stop position, they are rotatable relative to each other in a rotational direction against a restoring force and in the opposite rotational direction are coupled so as to prevent relative rotation, wherein the conveyor is configured to guide the first bar part in the collection mode by means of the feed collection lever and by force transmission via the coupling and to guide the first bar part in the feed mode at least partially by means of the feed lever with rotation relative to the second bar part.

The aforementioned terms have already been explained above in connection with the conveyor according to the invention and are therefore not explained here again. Advantageous embodiments of the baler according to the invention correspond to those of the conveyor according to the invention.

BRIEF DESCRIPTION OF THE DRAWING

In the following, the invention will be explained with the aid of the Figures. The Figures are only examples and do not limit the general concept of the invention in any way.

FIG. 4a shows a section illustration of the feed bar of FIG. 3, and FIG. 4b shows a section view according to section line IVb-IVb of FIG. 4a.

DESCRIPTION OF THE PREFERRED EMBODIMENTS

Figure 1:
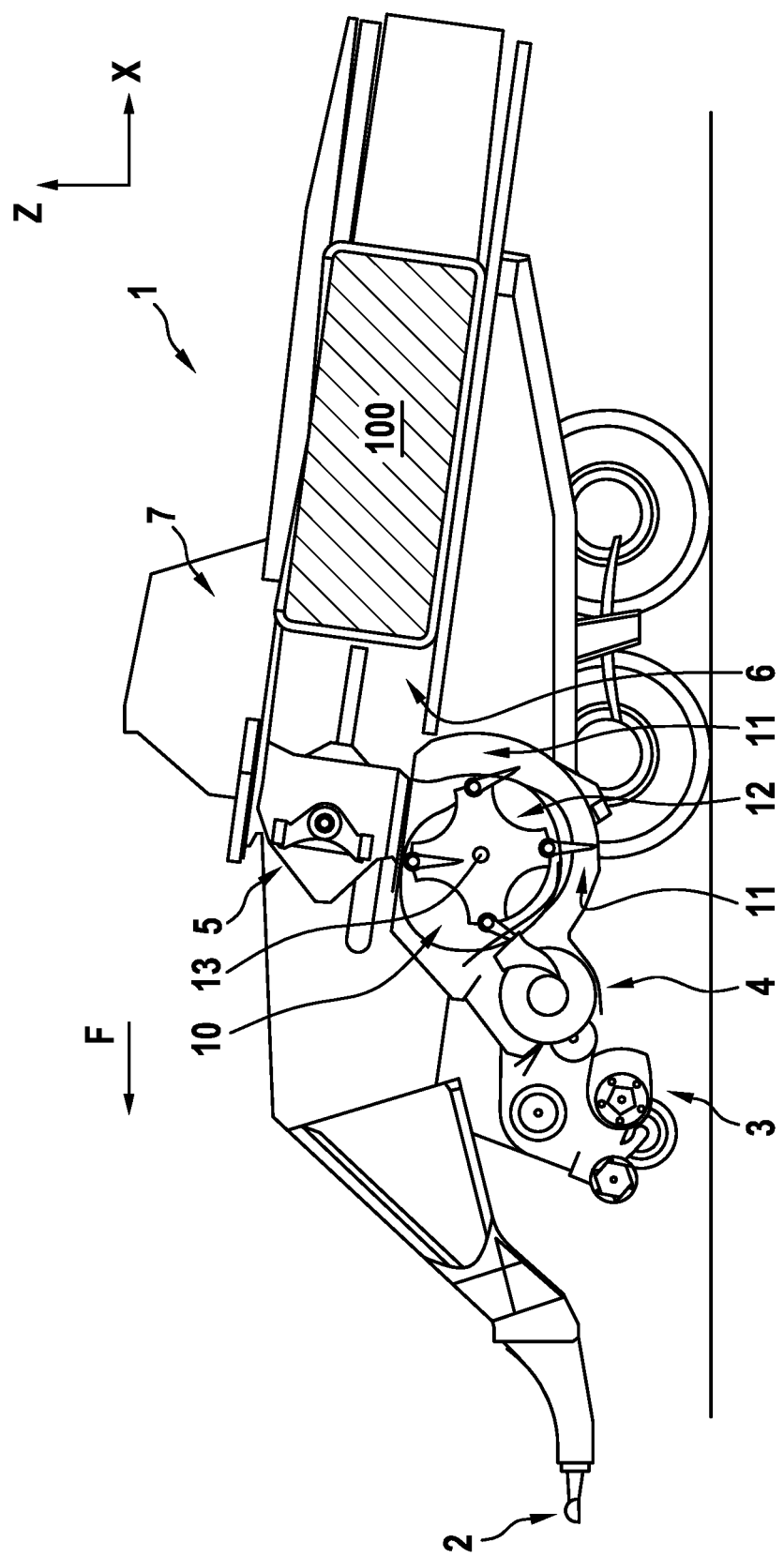
FIG. 1 is a section illustration of a baler according to the prior art.

FIG. 1 shows a baler, more precisely, a square baler 1, according to the prior art. As is known in the prior art, the square baler 1 is provided to be pulled by a towing vehicle or tractor (not illustrated) for which purpose a drawbar 2 is provided at the front end in the travel direction F. The invention is however not limited to pulled or supported balers but relates also to self-propelled balers. Also, the invention cannot only be applied to square balers 1 but also to round balers, for example. In relation to the travel direction F at the front end, a collecting device or pick-up 3 can be seen which in operation (in relation to FIG. 1) rotates in clockwise direction and serves to pick up crop, more precisely stem material such as straw, hay, or grass, from the ground. From the pick-up 3, the crop is transported to a cutting device 4 which rotates counterclockwise. It comprises a plurality of tines which engage the crop and transport it further opposite to the travel direction F and slightly upwardly to a collection chamber 11 which can also be referred to as collection channel. Instead of the cutting device 4, a conveyor could also be used that only conveys the crop and does not comminute it. The cutting device 4 could possibly also be entirely omitted.

Within the collection chamber 11, the crop is engaged by a conveyor 10 embodied as a rotary conveyor which can also be referred to as a collection device, conveying and collecting device, gathering device or crop gatherer. By means of the conveyor 10, the crop is conveyed within the collection chamber 11 counterclockwise, first along a longitudinal axis X (opposite to the travel direction F) to the rear as well as during the further course along a vertical axis Z upwardly in the direction toward the press chamber 6. For this purpose, the conveyor 10 comprises a plurality of rakes or bars (not identified in FIG. 1) that engage the crop with their tines. The bars are each pivotably supported on a rotor unit 12 which serves as a bar support and, in turn, is rotatably driven by a rotor shaft 13. In this context, the conveyor 10 effects, on the one hand, conveying the crop within the collection chamber 11 and, on the other hand, also a pre-compression against a retainer 70 (not illustrated in FIG. 1). Upon sufficient compression of the crop, the crop is conveyed out of the collection chamber 11 into the press chamber 6 as the retainer 70 releases the path. The press chamber 6 belongs to a press unit 5 which furthermore comprises a press piston (not identified) which is moved reciprocatingly in the press chamber 6 in order to press the crop collected in the press chamber 6 to a square bale 100. Above the press chamber 6, a tying unit 7 is arranged in which tying material (not illustrated) for tying the completed square bale 100 is stored. The precompression of the crop, on the one hand, as well as conveying from the collection chamber 11 into the press chamber 6, on the other hand, require a different movement of the bars, respectively, wherein in the first case one can speak of a collection mode of the conveyor 10 and in the latter case from a feed mode.

In relation to FIGS. 2 to 6b, a conveyor 10 according to the invention will be explained which enables by means of a mechanism that is as simple as possible a reliable switching between the collection mode and the feed mode. As can be seen in particular in FIG. 2, the rotor unit 12 is separated by a plurality of strippers 28 from the collection chamber 11 which is delimited by a bottom 20 arranged at a side opposite the strippers 28. Along a transverse axis Y on both sides of the rotor unit 12, two side walls 21, 23 are connected to the bottom 20 and delimit the collection chamber 11 laterally. The retainer 70 is pivotably supported about a retainer axis D and comprises a plurality of retainer sheets 71 that can pass through slots in the bottom 20 into the collection chamber 11.

The rotor unit 12 comprises, as mentioned, a rotor shaft 13 that can be rotatably driven about the rotor axis A. Two drum disks 14 (of which only one is illustrated) are connected fixedly (non-rotatably) to the rotor shaft 13. A plurality of bars 30, 60 are connected to both drum disks 14 so as to be freely pivotable, respectively. In the present case, a total of four collection bars 60 are provided and each one comprises a collection shaft 61 that is rotatable or pivotable about a collection axis C. A plurality of collection tines 62 are welded to the collection shaft 61. Also, a feed collection lever 63 is fixedly connected (non-rotatably) to the collection shaft 61 that by means of two collection rollers 64 (of which only one can be seen) interacts with a collection cam track 22 that is mounted stationarily at a first side wall 21. The collection cam track 22 functions in this context as a collection guide element. By interaction of the collection cam track 22 and the feed collection levers 63, the collection bars 60 are guided upon rotation about the rotor axis A, i.e., their orientation in relation to the collection axis C is controlled. During the circulation, the collection tines 62 pass through gaps between the strippers 28 into the collection chamber 11 and pierce the crop in order to convey the crop. Due to the stationary arrangement of the collection cam track 22, the movement path of the collection tines 62 is always the same, i.e., they move during the course of a revolution in the same manner, independent of whether the conveyor 10 is in collection mode or in feed mode.

Figure 3:
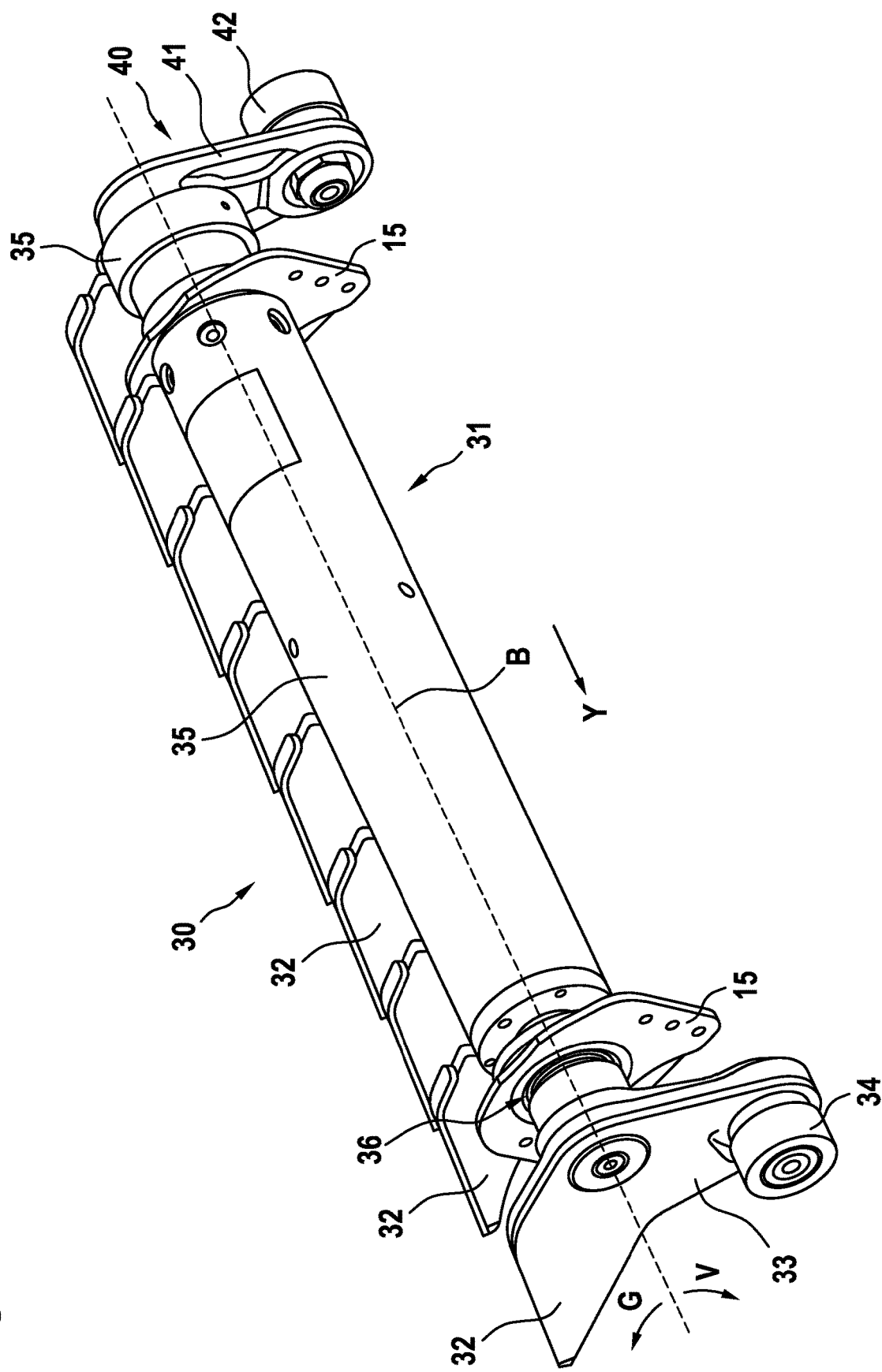
FIG. 3 is a perspective illustration of a feed bar of the conveyor of FIG. 2.

In addition to the collection bars 60, the conveyor 10 comprises a feed bar 30. The feed bar 30 is supported pivotably about feed axis B at the drum disks 14. The feed axis B defines an axial direction that extends parallel to the transverse axis Y. As can be seen in FIGS. 3 and 4a, the feed bar 30 comprises a plurality of feed tines 32 as well as a feed lever 33 which is fixedly (non-rotatably) connected to the feed bar 30 and in this case is embodied as one piece together with one of the feed tines 32. A feed roller 34 whose function will be explained in more detail in the following is supported at the feed lever 33. Most of the feed tines 32 are connected fixedly (non-rotatably) to a hollow shaft 35 which for construction-related reasons comprises a multi-part structure which will not be explained here in detail. The feed tines 32, the feed lever 33, as well as the hollow shaft 35 belong to a first bar part 31 of the feed bar 30. The feed bar 30 comprises also a second bar part 40 with a feed collection lever 41 at which two feed collection rollers 42 (can be seen in FIG. 4a and FIG. 6a) are rotatably supported.

The first bar part 31 and the second bar part 40 are rotatable relative to each other about the feed axis B. For this purpose, a shaft 43 of the second bar part 40 is supported by two rolling bearings 44 within the hollow shaft 35. This can be seen in FIG. 4a which is a section illustration parallel to the feed axis B. FIG. 4b shows the shaft 43 inside the hollow shaft 35 in a section illustration perpendicular to the feed axis B in accordance with the section line IVb-IVb of FIG. 4a. Moreover, a coupling 50 is intermediately arranged between the bar parts 31, 40. The coupling 50 comprises as a first coupling part a stop 51 which is connected fixedly (non-rotatably) to the hollow shaft 35; the coupling 50 comprises a second coupling part in the form of a follower 52 connected fixedly (non-rotatably) to the shaft 43. Moreover, a torsion spring 54 embodied as a coil spring is provided that is connected with one end to the shaft 43 or the follower 52 as well as with the other end to an insert 53 arranged fixedly (non-rotatably) inside of the hollow shaft 35.

Figure 2:
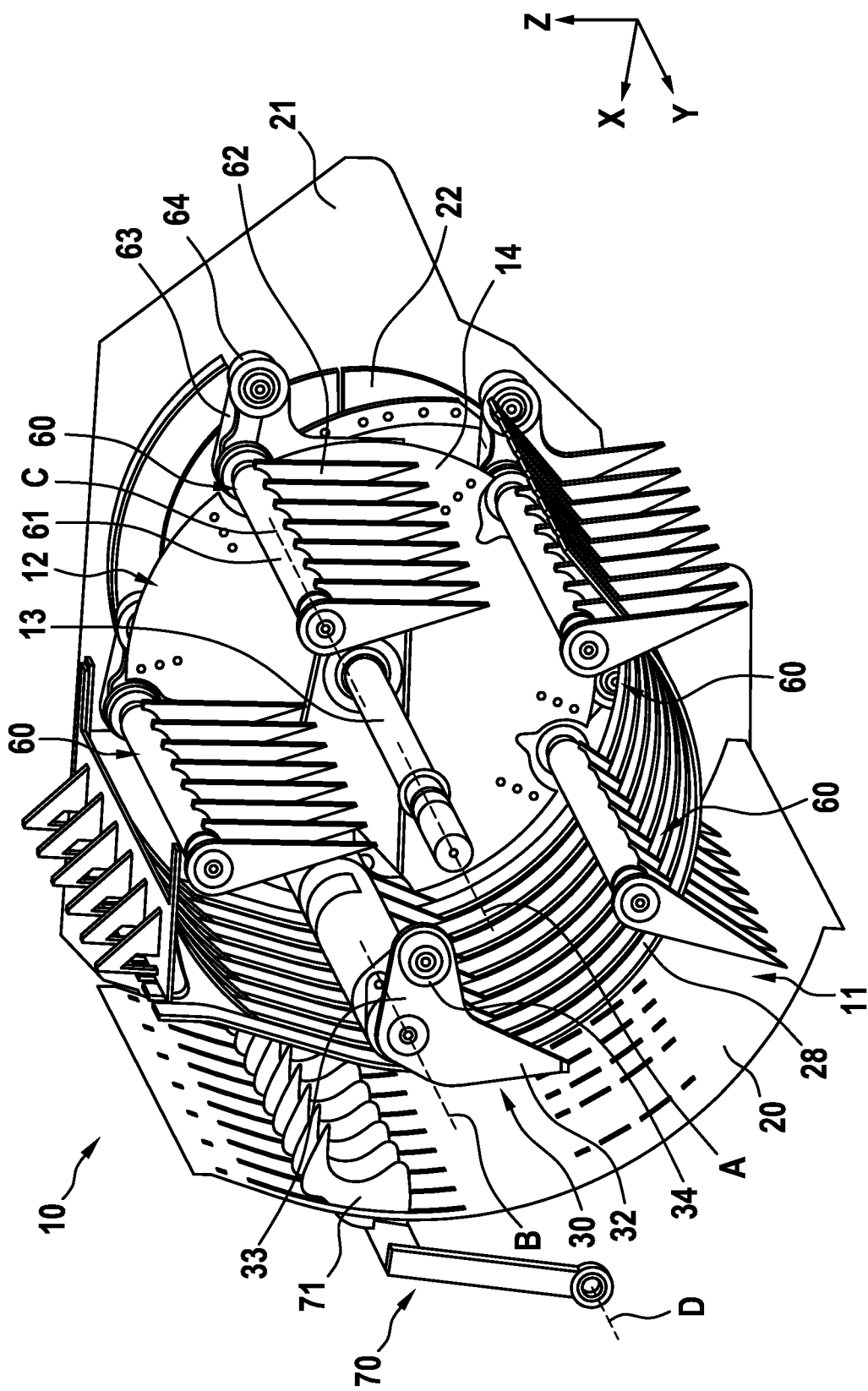
FIG. 2 is a first perspective illustration of a part of a baler with a conveyor according to the invention in a collection mode.
Figure 5:
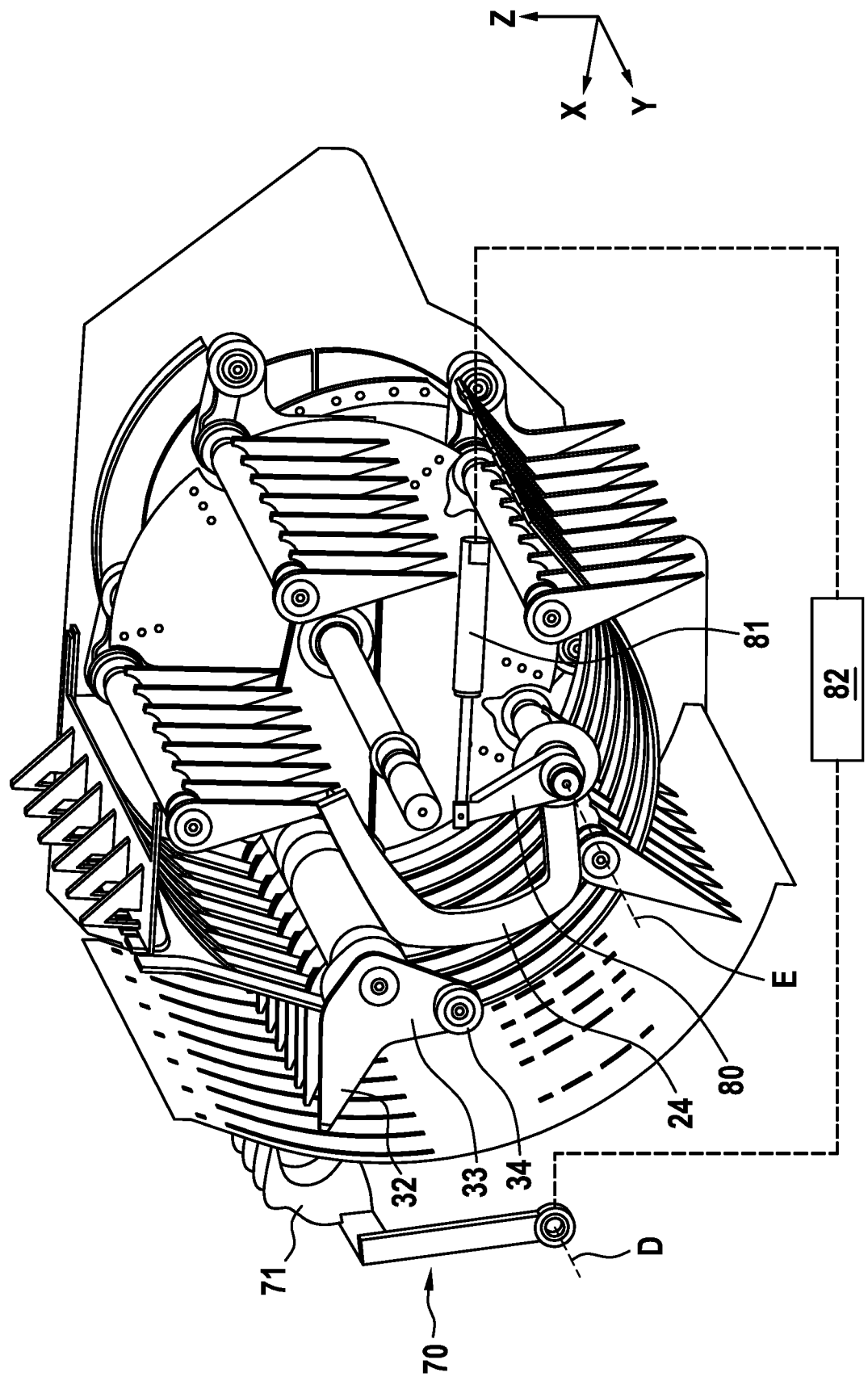
FIG. 5 shows a second perspective illustration of a part of a baler with the conveyor of FIG. 2 in a feed mode.

FIGS. 4a, 4b show the two bar parts 31, 40 in a stop position in which the stop 51 as well as the follower 52 form a form fit connection in tangential direction so that the first bar part 31 can rotate in a first rotational direction V but not in a second opposite rotational direction G in relation to the second bar part 40. Optionally, a buffer of elastomeric material can be arranged intermediately between the stop 51 and the follower 52. Due to the torsion spring 54 serving as an elastic spring element, upon rotation in the rotational direction V, a restoring torque in the opposite rotational direction toward the stop position is generated. The feed bar 30 is supported as a whole by two rolling bearings 36 at the drum disks 14 (not illustrated here) wherein the connection to the drum disks 14 is provided by a respective connection plate 15 that receives one of the rolling bearings 36, respectively. FIGS. 2 and 5 do not show the connection plates 15 for reasons of simplifying the illustration. The feed collection lever 41 is substantially identically configured as the feed collection levers 63 of the collection bars 60. The feed collection lever 41 interacts by means of the feed collection rollers 42 in the same manner with the collection cam track 22 as the feed collection levers 63. Thus, upon circulation of the feed bar 30 about the rotor axis A, the feed collection lever 41 and the second bar part 40 as a whole are always guided in the same manner by the stationary collection cam track 22.

Figure 6A:
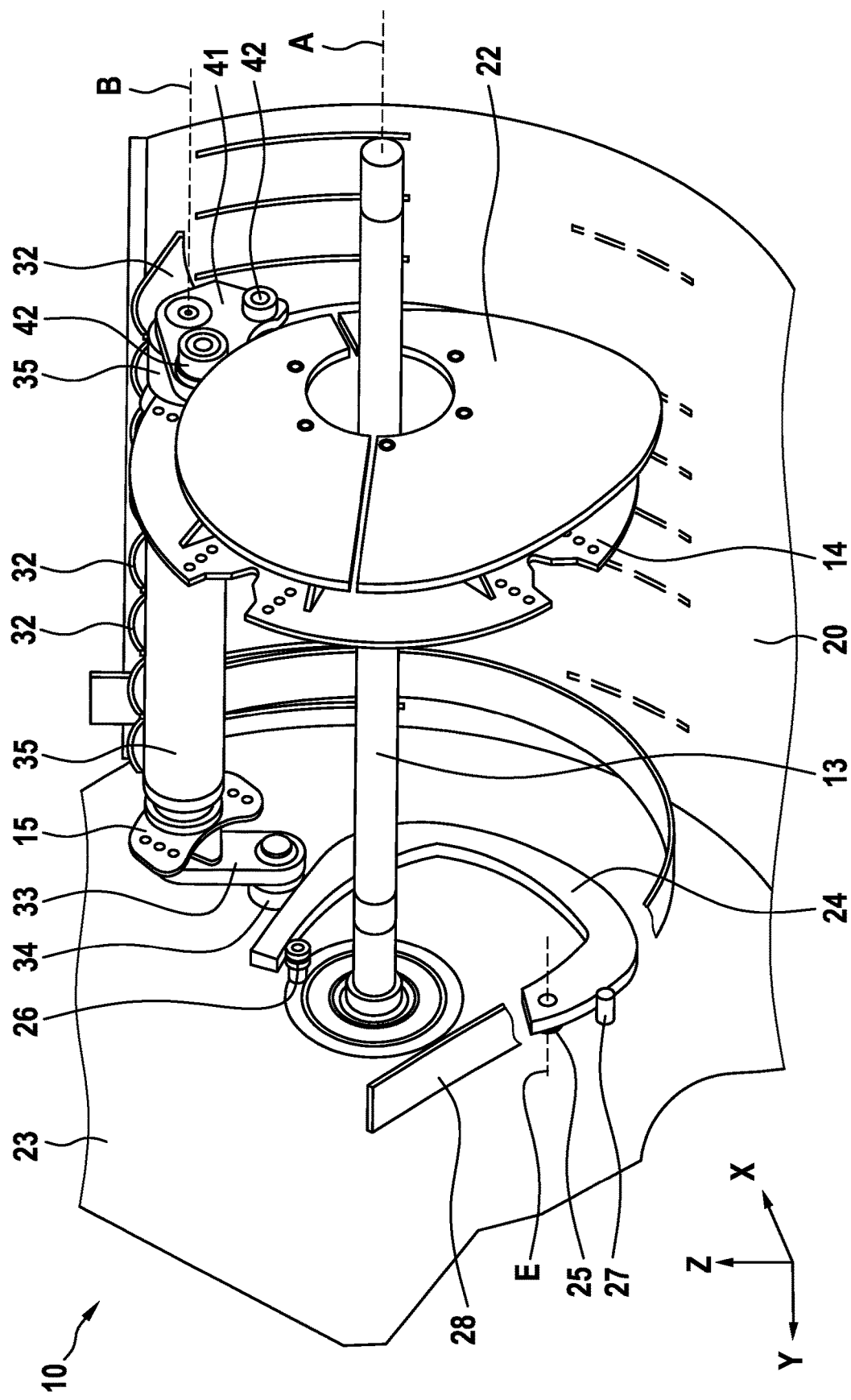
FIG. 6a is a third perspective illustration of a part of a baler with the conveyor of FIG. 2 in the feed mode.
Figure 6B:
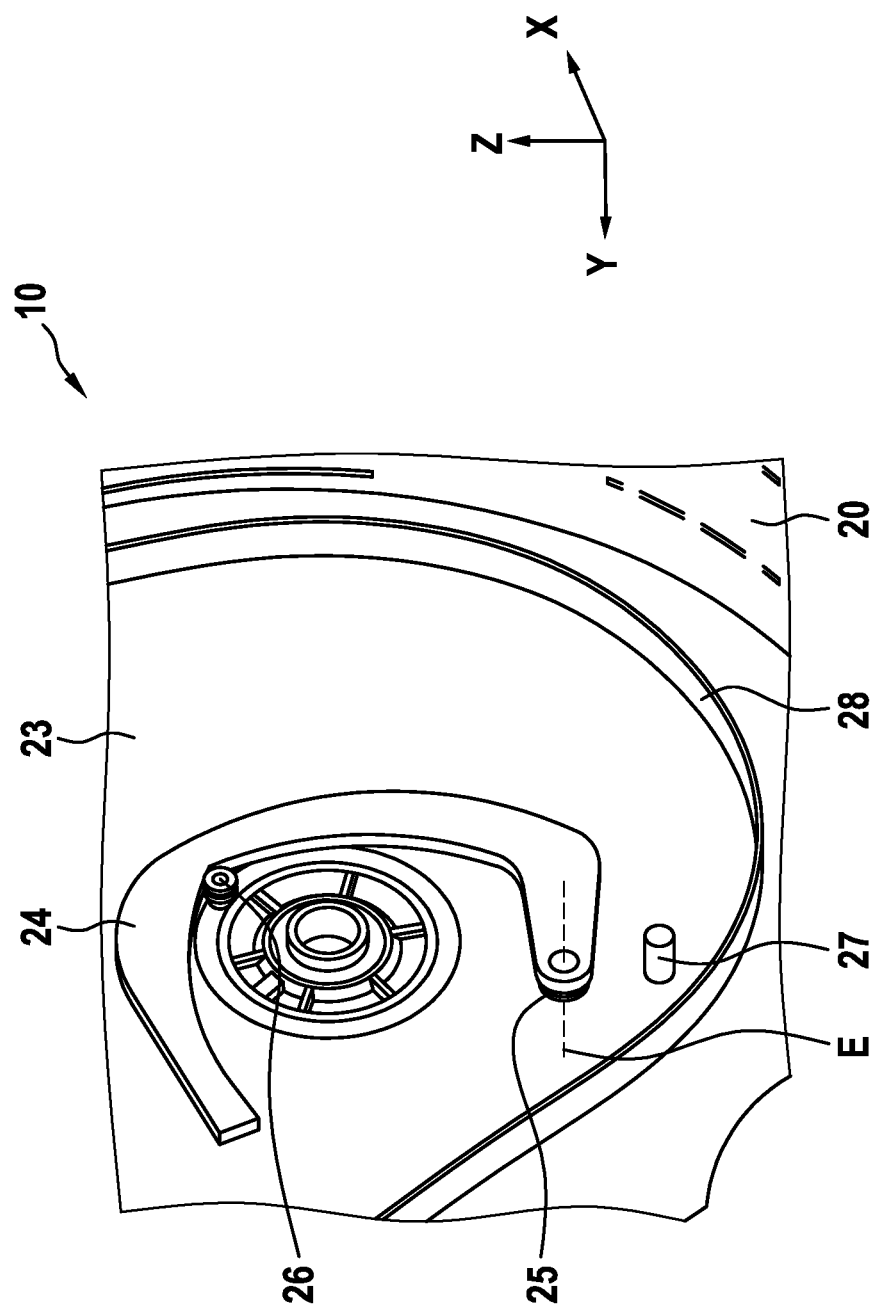
FIG. 6b is a fourth perspective illustration of a part of the baler with the conveyor of FIG. 2 in the collection mode.

Due to the action of the coupling 50, the two bar parts 31, 40 remain substantially in the stop position as long as no external force or no external torque acts on the feed lever 33. A control of the feed lever 33 can be realized by means of a feed cam track 24 which is pivotably arranged at the second side wall 23 and is illustrated in FIGS. 5, 6a, and 6b. More precisely, the feed cam track 24 is mounted on a cam track shaft 25 that is pivotable about a cam track axis E which is parallel to the rotor axis A. A cam track roller 26 is provided also for improved guiding of the feed cam track 24. A stop 27 fastened at the second side wall 23 defines in this context also a feed position of the feed cam track 24 that is illustrated in FIG. 5 as well as FIG. 6a. By pivoting about the cam track axis E, the feed cam track 24 reaches a collection position illustrated in FIG. 6b.

In the collection position, the feed cam track 24 as a whole is arranged so close to the rotor shaft A that the feed roller 34 cannot engage the feed cam track 24 at any point in time. No external torque therefore acts on the feed lever 33 so that the feed bar 30 as a whole is guided by the interaction of the collection cam track 22 and the feed collection lever 41. As already explained, the two bar parts 31, 40 remain in the stop position in this context. The movement path of the feed tines 32 corresponds in this context approximately to that of the collection tines 62. The position of the feed tines 32 illustrated in FIG. 2 corresponds to the collection mode.

The pivot movement of the feed cam track 24 is controlled by a switch lever 80 as well as a hydraulic cylinder 81 engaging the switch lever 80. The hydraulic cylinder 81 in turn is connected to a control unit 82 which in turn registers by a suitable rotary encoder the deflection of the retainer 70 about the retainer axis D. The switch lever 80, the hydraulic cylinder 81 as well as the control device 82 are illustrated in FIG. 5, wherein the second side wall 23 has been omitted for simplification of the illustration. When the retainer 70 is deflected by action of the precompressed crop on the retainer sheets 71 about a predetermined angle, this is registered by the control unit 82; the control unit 82 moves by means of the hydraulic cylinder 81 the feed cam track 24 into the feed position illustrated in FIG. 6a.

In this feed position, the feed cam track 24 is at least partially spaced apart from the rotor axis A such that the feed roller 34 of the feed lever 33 is in engagement with the feed cam track 24 during a portion of the circulation path. This leads to an elastic rotation of the first bar part 31 relative to the second bar part 40 which is guided in a constant manner by the collection cam track 22. By rotation of the bar parts 31, 40 relative to each other, the movement path of the feed tines 32 changes such that, in contrast to the collection tines 62, they remain in the collection chamber 11 across a larger portion of the circulating path of the feed bar 30 and thus convey the crop upwardly out of the collection chamber 11 into the press chamber 6, as indicated in FIG. 5. The corresponding change of the movement path of the feed tines 32 concerns in this context only a portion of the circulation of the feed bar 30 for which reason the feed cam track 24 extends effectively only about an angle range of less than 180° about the rotor axis A. Outside of this angle range, no guiding of the feed lever 33 is provided. The feed lever 33 is returned by the action of the torsion spring 54 together with the first bar part 31 back into the stop position so that the feed tines 32 for the remainder of the circulation move similar to the collection tines 62 until the feed roller 34 again engages the feed cam track 24 and a relative rotation of the bar parts 31, 40 relative to each other occurs anew. Since the feed cam track 24 is required for only a portion of the entire circulation path, it can be embodied comparatively lightweight and in a material saving manner.

After the crop has been conveyed out of the collection chamber 11, which can also be detected by the deflection of the retainer 70, the control unit 82 returns the feed cam track 24 back into the collection position.

The specification incorporates by reference the entire disclosure of German priority document 10 2021 106 061.3 having a filing date of Mar. 12, 2021.

While specific embodiments of the invention have been shown and described in detail to illustrate the inventive principles, it will be understood that the invention may be embodied otherwise without departing from such principles.

What is claimed is:

1. A conveyor for a baler, the conveyor comprising:
a feed bar extending along an axial feed axis and comprising a first bar part, a second bar part, and a coupling connecting the first bar part and the second bar part to each other;
wherein the first bar part comprises a plurality of feed tines and a feed lever;
wherein the second bar part comprises a feed collection lever;
wherein the first bar part and the second bar part are connected to each other by the coupling such that, beginning from a stop position of the coupling, the first bar part and the second bar part are rotatable relative to each other about the axial feed axis in a first rotational direction against a restoring force and are coupled to each other in the stop position to prevent a rotation relative to each other in a second rotational direction that is opposite to the first rotational direction;
wherein the conveyor comprises a collection mode and a feed mode, wherein the conveyor is configured to convey crop within a collection chamber in a direction toward a press chamber by the plurality of feed tines of the first bar part in the collection mode and is further configured to convey crop from the collection chamber into the press chamber by the plurality of feed tines of the first bar part in the feed mode;
wherein the conveyor is configured to guide the first bar part in the collection mode by the feed collection lever of the second bar part and by a force transmission via the coupling;
wherein the conveyor is further configured to guide the first bar part in the feed mode at least partially by the feed lever of the first bar part by rotating the first bar part relative to the second bar part in the first rotational direction;
a drivable bar support, wherein the feed bar is rotatably supported about the axial feed axis at the drivable bar support, wherein the drivable bar support is a rotor unit drivable in rotation about a rotor axis that is spaced apart from the axial feed axis;
a collection guide element interacting with the feed collection lever of the second bar part to guide the first bar part in the collection mode, and further comprising a feed guide element interacting with the feed lever of the first bar part to at least partially guide the first bar part in the feed mode.

2. The conveyor according to claim 1, wherein the feed guide element is configured to interact in the feed mode only temporarily with the feed lever of the first bar part so that the first bar part is guided intermittently by the collection guide element interacting with the feed collection lever of the second bar part.

3. The conveyor according to claim 1, wherein the coupling is received at least partially inside the first bar part.

4. The conveyor according to claim 1, wherein the coupling comprises a first coupling part and a second coupling part, wherein the first coupling part is fixedly connected to the first bar part, wherein the second coupling part is fixedly connected to the second bar part, wherein the first coupling part and the second coupling part in the stop position form at least indirectly a tangential form fit connection with each other, wherein the coupling further comprises an elastic spring element providing the restoring force and connected at least indirectly in a force-transmitting manner to the first bar part and to the second bar part.

5. The conveyor according to claim 4, wherein the elastic spring element is a torsion spring.

6. The conveyor according to claim 1, wherein the second bar part comprises an axially extending shaft arranged at least mostly inside the first bar part.

7. A feed bar for the conveyor of claim 1, the feed bar comprising:
a first bar part, a second bar part, and a coupling connecting the first bar part and the second bar part to each other, wherein the feed bar extends along an axial feed axis;
wherein the first bar part comprises a plurality of feed tines and a feed lever;
wherein the second bar part comprises a feed collection lever;
wherein the first bar part and the second bar part are connected to each other by the coupling such that, beginning from a stop position of the coupling, the first bar part and the second bar part are rotatable relative to each other about the axial feed axis in a first rotational direction against a restoring force and are coupled to each other in the stop position to prevent a rotation relative to each other in a second rotational direction that is opposite to the first rotational direction;
wherein the feed bar is configured to convey crop within a collection chamber in a direction toward a press chamber by the plurality of feed tines of the first bar part in a collection mode and is further configured to convey crop from the collection chamber into the press chamber by the plurality of feed tines of the first bar part in a feed mode;
wherein the feed bar is configured to guide the first bar part in the collection mode by the feed collection lever of the second bar part and by a force transmission via the coupling;
wherein the feed bar is further configured to guide the first bar part in the feed mode at least partially by the feed lever of the first bar part by rotating the first bar part relative to the second bar part in the first rotational direction.

8. A baler comprising:
a collection chamber;
a press chamber;
a conveyor according to claim 1.

9. A conveyor for a baler, the conveyor comprising:
a feed bar extending along an axial feed axis and comprising a first bar part, a second bar part, and a coupling connecting the first bar part and the second bar part to each other;
wherein the first bar part comprises a plurality of feed tines and a feed lever;
wherein the second bar part comprises a feed collection lever;
wherein the first bar part and the second bar part are connected to each other by the coupling such that, beginning from a stop position of the coupling, the first bar part and the second bar part are rotatable relative to each other about the axial feed axis in a first rotational direction against a restoring force and are coupled to each other in the stop position to prevent a rotation relative to each other in a second rotational direction that is opposite to the first rotational direction;
wherein the conveyor comprises a collection mode and a feed mode, wherein the conveyor is configured to convey crop within a collection chamber in a direction toward a press chamber by the plurality of feed tines of the first bar part in the collection mode and is further configured to convey crop from the collection chamber into the press chamber by the plurality of feed tines of the first bar part in the feed mode;

wherein the conveyor is configured to guide the first bar part in the collection mode by the feed collection lever of the second bar part and by a force transmission via the coupling;

wherein the conveyor is further configured to guide the first bar part in the feed mode at least partially by the feed lever of the first bar part by rotating the first bar part relative to the second bar part in the first rotational direction;

a drivable bar support, wherein the feed bar is rotatably supported about the axial feed axis at the drivable bar support, wherein the drivable bar support is a rotor unit drivable in rotation about a rotor axis that is spaced apart from the axial feed axis;

a collection guide element interacting with the feed collection lever of the second bar part to guide the first bar part in the collection mode, and further comprising a feed guide element interacting with the feed lever of the first bar part to at least partially guide the first bar part in the feed mode;

a collection bar supported rotatably about a collection axis at the rotor unit, wherein the collection bar comprises a plurality of collection tines and a collection lever interacting at least in the collection mode with the collection guide element.

10. A conveyor for a baler, the conveyor comprising:
a feed bar extending along an axial feed axis and comprising a first bar part, a second bar part, and a coupling connecting the first bar part and the second bar part to each other;

wherein the first bar part comprises a plurality of feed tines and a feed lever;

wherein the second bar part comprises a feed collection lever;

wherein the first bar part and the second bar part are connected to each other by the coupling such that, beginning from a stop position of the coupling, the first bar part and the second bar part are rotatable relative to each other about the axial feed axis in a first rotational direction against a restoring force and are coupled to each other in the stop position to prevent a rotation relative to each other in a second rotational direction that is opposite to the first rotational direction;

wherein the conveyor comprises a collection mode and a feed mode, wherein the conveyor is configured to convey crop within a collection chamber in a direction toward a press chamber by the plurality of feed tines of the first bar part in the collection mode and is further configured to convey crop from the collection chamber into the press chamber by the plurality of feed tines of the first bar part in the feed mode;

wherein the conveyor is configured to guide the first bar part in the collection mode by the feed collection lever of the second bar part and by a force transmission via the coupling;

wherein the conveyor is further configured to guide the first bar part in the feed mode at least partially by the feed lever of the first bar part by rotating the first bar part relative to the second bar part in the first rotational direction;

a drivable bar support, wherein the feed bar is rotatably supported about the axial feed axis at the drivable bar support, wherein the drivable bar support is a rotor unit drivable in rotation about a rotor axis that is spaced apart from the axial feed axis;

a collection guide element interacting with the feed collection lever of the second bar part to guide the first bar part in the collection mode, and further comprising a feed guide element interacting with the feed lever of the first bar part to at least partially guide the first bar part in the feed mode;

wherein the collection guide element comprises a collection cam track, wherein the feed collection lever of the second bar part comprises a collection engagement element spaced apart from the axial feed axis, wherein the collection engagement element of the feed collection lever of the second bar part engages the collection cam track at least in the collection mode, wherein the feed guide element comprises a feed cam track, wherein the feed lever of the first bar part comprises a feed engagement element spaced apart from the axial feed axis, wherein the feed engagement element of the feed lever of the first bar part engages the feed cam track in the feed mode.

11. The conveyor according to claim 10, wherein the collection cam track is arranged in the same position in the collection mode and in the feed mode so that the second bar part is guided by the feed collection lever on the collection cam track in the collection mode and in the feed mode.

12. The conveyor according to claim 10, wherein the feed cam track is arranged in a collection position in the collection mode, wherein the feed engagement element is out of engagement with the feed cam track in the collection position, wherein the feed cam track is adjusted into a feed position in the feed mode, and wherein the feed engagement element is brought into engagement with the feed cam track in the feed position.

13. The conveyor according to claim 12, wherein the feed cam track is configured to be pivotable back and forth between the collection position and the feed position.

14. A conveyor for a baler, the conveyor comprising:
a feed bar extending along an axial feed axis and comprising a first bar part, a second bar part, and a coupling connecting the first bar part and the second bar part to each other;

wherein the first bar part comprises a plurality of feed tines and a feed lever;

wherein the second bar part comprises a feed collection lever;

wherein the first bar part and the second bar part are connected to each other by the coupling such that, beginning from a stop position of the coupling, the first bar part and the second bar part are rotatable relative to each other about the axial feed axis in a first rotational direction against a restoring force and are coupled to each other in the stop position to prevent a rotation relative to each other in a second rotational direction that is opposite to the first rotational direction;

wherein the conveyor comprises a collection mode and a feed mode, wherein the conveyor is configured to convey crop within a collection chamber in a direction toward a press chamber by the plurality of feed tines of the first bar part in the collection mode and is further configured to convey crop from the collection chamber into the press chamber by the plurality of feed tines of the first bar part in the feed mode;

wherein the conveyor is configured to guide the first bar part in the collection mode by the feed collection lever of the second bar part and by a force transmission via the coupling;

wherein the conveyor is further configured to guide the first bar part in the feed mode at least partially by the feed lever of the first bar part by rotating the first bar part relative to the second bar part in the first rotational direction;

a retainer delimiting the collection chamber in relation to the press chamber, and further comprising a control unit, wherein the control unit triggers a change from the collection mode to the feed mode as a function of an action of the crop on the retainer.

\* \* \* \* \*